(12) United States Patent
Cintra et al.

(10) Patent No.: US 7,303,594 B2
(45) Date of Patent: Dec. 4, 2007

(54) BATTERY ELECTRODE AND METHOD OF MAKING THE SAME

(75) Inventors: George Cintra, Holliston, MA (US); Kenneth Taylor, South Attleboro, MA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 10/034,901

(22) Filed: Dec. 27, 2001

(65) Prior Publication Data

US 2003/0124422 A1   Jul. 3, 2003

(51) Int. Cl.
*H01M 6/00* (2006.01)

(52) U.S. Cl. .................... 29/623.1; 29/623.5

(58) Field of Classification Search ............... 29/623.3, 29/623.5, 623.1; 427/58, 402, 401, 209, 427/355; 141/1.1; 429/209, 128, 232
See application file for complete search history.

(56) References Cited

U.S. PATENT DOCUMENTS

| | | | |
|---|---|---|---|
| 5,582,623 A | * | 12/1996 | Chu ........................ 29/623.1 |
| 5,834,052 A | | 11/1998 | Fukumura et al. |
| 6,149,119 A | | 11/2000 | O'Connell |
| 6,402,796 B1 | * | 6/2002 | Johnson ................... 29/623.5 |
| 2002/0168576 A1 | * | 11/2002 | Hamamoto et al. ......... 429/331 |

* cited by examiner

*Primary Examiner*—Raymond Alejandro
(74) *Attorney, Agent, or Firm*—Fish & Richardson P.C.

(57) ABSTRACT

A method of making a battery cathode includes forming a first layer having a cathode mixture on a substrate, separating, e.g., removing, the substrate from the first layer, and incorporating the first layer into the battery cathode.

13 Claims, 6 Drawing Sheets

FIG. 5

| Cell | Binder Wt% | Cathode Thickness (mm) | Bulk Porosity (%) | Charge | | | Discharge |
| --- | --- | --- | --- | --- | --- | --- | --- |
| | | | | Current Density (mA/cm²) | Charge Capacity (mAh/g) | Service Hours to 1.8V @250 mW PDA | Energy Density to 1.8V Cutoff (mAh/g) [efficiency] |
| A1 | 4.0 | 0.810 | 27.4 | 0.40 | 125 | 203 | 116 [93%] |
| B1 | 4.9 | 0.806 | 25.8 | 0.38 | 132 | 203 | 113 [86%] |
| B2 | 4.9 | 0.812 | 25.9 | 0.38 | 121 | 206 | 120 [99%] |
| C1 | 5.8 | 0.796 | 25.0 | 0.39 | 123 | 190 | 114 [93%] |
| C2 | 5.8 | 0.789 | 24.9 | 0.38 | 110 | 182 | 106 [96%] |

FIG. 6

| Cell | Electrode Thickness (mm) | Current Density (mA/cm²) | Charge Capacity (mAh/g) | Bulk Porosity (%) | Service Hours @250 mW PDA | mAh/r to Cutoff |
| --- | --- | --- | --- | --- | --- | --- |
| 1 | 0.173 | 0.37 | 135 | 21.1 | 42 | 108 |
| 2 | 0.181 | 0.37 | 134 | 24.3 | 40 | 101 |
| 3 | 0.483 | 0.41 | 130 | 21.0 | 100 | 94 |
| 4 | 0.599 | 0.37 | 132 | 21.6 | 177 | 120 |
| 5 | 0.734 | 0.39 | 122 | 23.1 | 175 | 112 |

FIG. 7

| Cell | Cathode Thickness (mm) | Current (mA) | Power (mW) |
|---|---|---|---|
| A | .102 | 240 | 912 |
| B | 0.267 | 160 | 608 |
| C | 0.558 | 40 | 152 |
| D | 0.667 | 35 | 133 |
| E | 0.700 | 25 | 95 |
| F | 1.08 | 21 | 80 |

BATTERY ELECTRODE AND METHOD OF MAKING THE SAME

TECHNICAL FIELD

The invention relates to batteries, in particular, to battery electrodes and methods of making the same.

BACKGROUND

Batteries are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material. In order to prevent direct reaction of the anode material and the cathode material, the anode and the cathode are electrically isolated from each other by a separator.

When a battery is used as an electrical energy source in a device, electrical contact is made to the anode and the cathode, allowing electrons to flow through the device and permitting the respective oxidation and reduction reactions to occur to provide electrical power. An electrolyte, for example, potassium hydroxide, in contact with the anode and the cathode contains ions that flow through the separator between the electrodes to maintain charge balance throughout the battery during discharge.

In some cases, the cathode is formed by coating a cathode mixture directly on a current collector, e.g., a conductive mesh. After coating, the cathode mixture is dried. Drying can cause the cathode to shrink, and in some cases, cause excessive stress in the cathode that lead to undesirable defects, such as cracks, and/or loss of adhesion to the current collector. As a result, this method of making a cathode can limit the loading (the amount of active material that can be formed on the cathode) and the performance of the cathode and the battery in which the cathode is used.

SUMMARY

The invention relates to batteries, in particular, to battery electrodes and methods of making the same.

The invention features a method of making a cathode having relatively high active material loading. The cathode can be made relatively thick and with minimized defects. As a result, the performance of the cathode, e.g., the current density and the service life, can be enhanced. In some embodiments, the cathode can also be formed with a cross sectional profile that is not homogenous. For example, the cathode can be formed with strata having modified chemical and/or physical properties to effect enhanced properties.

In one aspect, the invention features a method of making a battery electrode. The method includes forming a first layer comprising a cathode mixture on a substrate, separating the substrate from the first layer, and incorporating the first layer into the battery electrode. In some embodiments, a substantial portion of the substrate, for example, over 50%, over 75%, over 90%, or 100%, is removed from the first layer.

Embodiments include one or more of the following features. The cathode mixture is in the form of a slurry. The substrate includes a material selected from a group consisting of a polymer, a metal, and paper. The substrate includes a polymer.

The method can further include forming a second layer having the cathode mixture, and contacting the second layer with the first layer. The method further includes calendering the first and second layers, which can be performed under heat. Contacting the second layer with the first layer can increase the density of the first and second layers.

The method can further include contacting the separated first layer with a current collector. The method can further include bonding the separated first layer and the current collector under pressure. The current collector can include an electrically conductive binder.

The method can further include laminating the first layer to a plurality of layers, each one of the plurality of layers having a cathode material. The cathode material can be selected from a group consisting of a cathode active material, a binder, and a conductive aid.

One or more steps of the method can be performed in a continuous process.

In another aspect, the invention features a method of making a battery electrode including forming a first layer having a first cathode mixture on a substrate, separating the substrate from the first layer, laminating the first layer to a second layer comprising a second cathode mixture, and incorporating the laminated first and second layers into the battery electrode.

Embodiments may include one or more of the following features. The first and second cathode mixtures are substantially the same. The first and second cathode mixtures are different. The first and second mixtures have different chemical compositions. Laminating includes calendering the first and second layers. The method further includes bonding the laminated first and second layers to a current collector.

In another aspect, the invention features a battery cathode having a thickness greater than about 100 micrometers.

In another aspect, the invention features a battery cathode having a current density greater than about 1 mA/cm².

In another aspect, the invention features a battery cathode formed of a plurality of layers, each layer having a cathode material.

Embodiments may include one or more of the following features. The cathode material is selected from a group consisting of a cathode active material, a binder, and a conductive aid. At least two of the layers have different porosities. At least two of the layers have different electronic conductivities. At least two of the layers have different chemical compositions. At least two of the layers have different concentrations of a binder. The cathode further includes a current collector in contact with one of the layers. The current collector includes a conductive adhesive. The layers have increasing porosities relative to the distance from the current collector. The layers have increasing electronic conductivities relative to the distance from the current collector.

Other features and advantages of the invention will be apparent from the description of the preferred embodiments thereof and from the claims.

DESCRIPTION OF DRAWINGS

FIG. 5 is a table summarizing test results for embodiments of cells having cathodes with different concentrations of binder.

FIG. 6 is a table summarizing test results for embodiments of cells charged at a constant C-rate and cells charged at constant current density.

FIG. 7 is a table showing the limiting currents (for 80% capacity utilization) for embodiments of cells having cathodes with different thickness under continuous drain.

DETAILED DESCRIPTION

Figure 1:
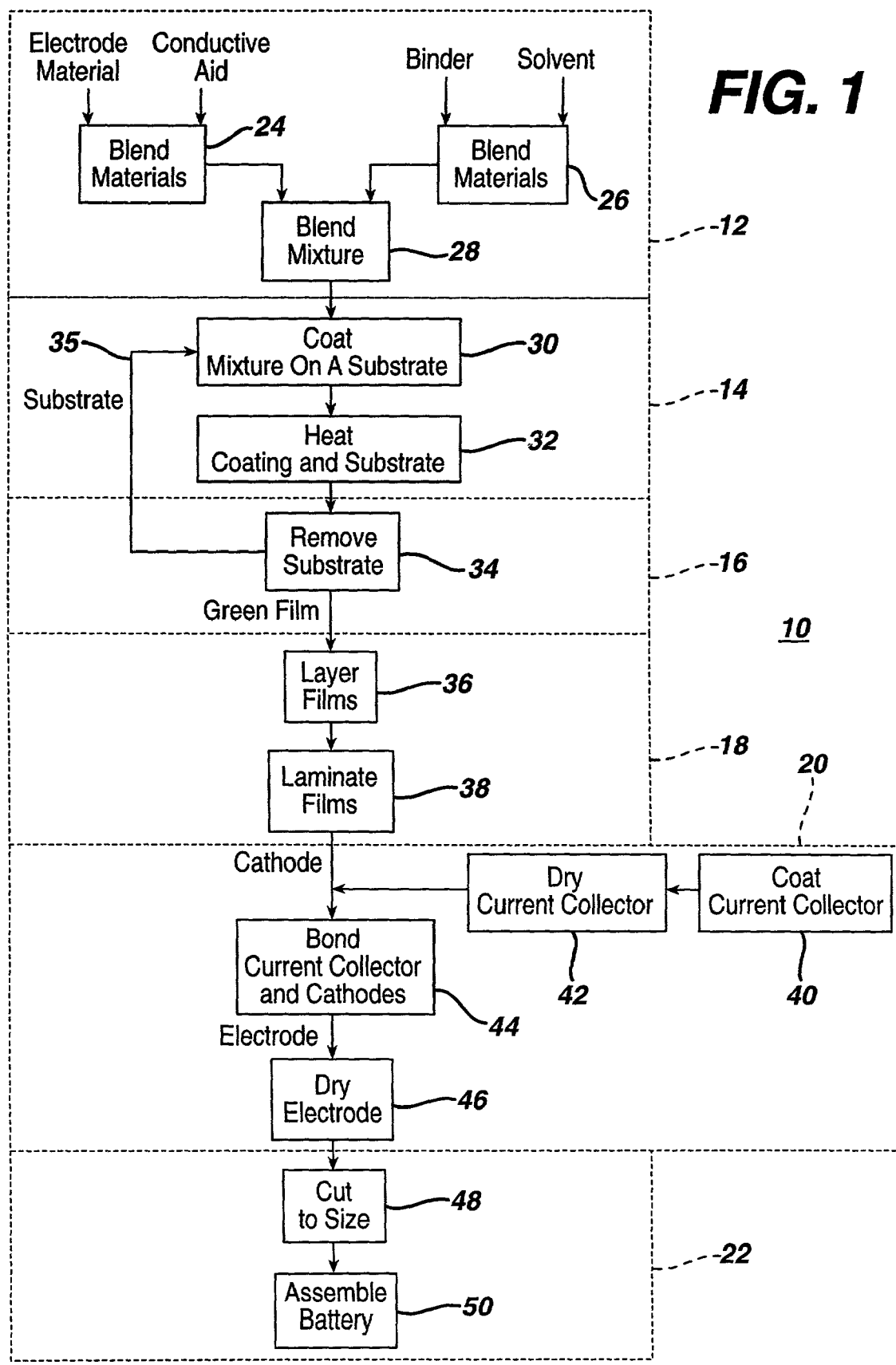
FIG. 1 is a block diagram of an embodiment of a method of making a battery electrode.

FIG. 1 shows an embodiment of a method 10 of fabricating a battery electrode, e.g., a cathode. Method 10 generally includes the steps of forming a cathode mixture (step 12), applying a layer of the cathode mixture to a substrate (step 14), separating the layer from the substrate (step 16), layering a plurality of layers (step 18) of the cathode mixture to form a cathode, and applying the plurality of layers to a current collector (step 20) to form the battery electrode. The battery electrode can then be incorporated into a battery (step 22).

Forming the cathode mixture (step 12) includes forming a homogenous mixture that can be applied to a substrate to form a layer. Generally, the specific composition of the cathode mixture depends on the type of battery in which the cathode will be used. It is believed that method 10 is not limited in application to a particular type of cathode or battery. For example, depending on the specific composition, the cathode formed by method 10 can be used in a primary alkaline battery, a lithium ion battery, a lithium-polymer battery, a metal-air battery, an air-recovery battery, or a secondary battery.

In certain embodiments, the cathode mixture is a slurry that includes an electrode active material, a conductive aid, a binder, and a solvent. For example, the active material can include manganese oxides; lithium cobalt oxides; noble metals (e.g., Pt, Pd, and Ru); silver-based catalysts; permanganates (e.g., $AgMnO_4$ and $KMnO_4$), and decomposition products of metal heterocycles (e.g., iron tetraphenylporphyrin, cobalt tetramethoxyphenylporphyrin, cobalt pthalocyanine, and iron pthalocyanine); and napthenates (e.g., cobalt napthenate and manganese napthenate). The conductive aid can include a carbon material, such as graphite or carbon black. The binder can include polymers that are relatively stable when in contact with the active materials. Examples of polymers include, but are not limited to, fluorinated polymers, such as homopolymers of polyvinylidene fluoride (PVDF), co-polymers of PVDF and hexafluoropropylene (HFP), and terpolymers of PVDF, HFP and polytetrafluoroethylene (PTFE). Commercial examples of these polymers include, but are not limited, to Viton (and derivatives thereof) (duPont), Teflon (powder or in dispersion form), and Kynar (and derivatives thereof). The solvent can dissolve and/or disperse the binder in the cathode mixture, allowing the resulting flowable mixture to develop good stability and useful viscosity properties (e.g., consistency) for processing, e.g., so that the slurry can be applied to a substrate (step 14). In some embodiments, the slurry has the consistency of an ink to the consistency of a relatively thick paste, e.g., toothpaste. Preferably, the solvent can be easily removed from the cathode mixture, e.g., by heating or vacuum. Examples of solvents include ketone-based solvents, such as acetone, MEK (methyl ethyl ketone), DIBK (diisobutyl ketone), NMP (n-methylpyrrolidone), MIBK (methyl isobutyl ketone) (Sigma-Aldrich or Fischer Scientific), or mixtures of these solvents. Mixtures of these solvents can allow the drying characteristics and/or viscosity profile of the resulting coating (or slurry) to be tailored, e.g., for manufacturability. In some embodiments, the cathode has an amount of solvent sufficient to dissolve the binder, or to provide the desired consistency to the cathode mixture, e.g., about 51-57% by weight of solids.

In some embodiments, the cathode mixture further includes a dispersing aid. The dispersing aid can provide the cathode mixture with a desired consistency or viscosity while having less solvent, compared to a cathode mixture with no dispersing aid. An example of a dispersing aid is Disperse-Ayd (1, 6 & 8, 7, 15) from Element is Specialties, Highstown, N.J.

Referring to FIG. 1, the electrode material and the conductive aid are pre-blended (step 24) separately from the binder and the solvent, which are also pre-blended (step 26). Without wishing to be bound by theory, it is believed that pre-blending enhances contact between the electrode material and the conductive aid to provide enhanced electrochemical performance.

After pre-blending, the components of the cathode mixture are blended together, e.g., to form the cathode slurry (step 28). For example, the components are blended in a high shear double planetary mixer until the mixture is a homogeneous dispersion relatively free of air, e.g., with no air bubbles. Trapped air bubbles can produce pinholes in the film that can adversely affect electrochemical performance. A vacuum can be applied after mixing to minimize trapped air. If the mixture is relatively thick, blending can be performed under vacuum to help remove air from the mixture.

The components can also be blended until the mixture reaches a predetermined fineness of grind or agglomerate level. In some embodiments, the fineness of grind is equal to or less than about 20 micrometers, or equal to or less than about 10 micrometers, as measured using a Hegman gauge. A Hegman gauge is a metal bar having a reservoir that is graduated in depth. The depth ranges, for example, from about 1 mm to about 10 micron. To evaluate dispersion quality of a slurry, the reservoir is filled, and where the slurry cannot cover a depth corresponds to a minimum particulate or agglomerate size. In certain embodiments, the mixture is subjected to a second blending step under high shear to further homogenize the mixture and minimize any agglomerates in the slurry. The second blending step can be performed, for example, at less than 100° C.

After blending (step 28) is completed, the cathode mixture is applied to a substrate to form a layer on the substrate (step 30). The substrate can be any material that can support the layer and allow the cathode to be relatively easily removed from the substrate after the mixture is dried (described below). Preferably, the substrate can withstand the conditions to which it is exposed during fabrication, e.g., drying temperatures and exposure to the solvent, without negative effects. Preferably, the substrate imparts no or relatively minimal impurities to the cathode layer. The substrates can include, for example, polymers, such as polyethylene terephthalate (PET), polyethylene, polypropylene polypropylene, polycarbonate, polyimide, polyamide, paper, and metals, including, but not limited to, aluminum, steel, copper, and nickel. The substrate can be smooth, or textured, e.g., rough, to provide texture to the cathode layer.

The substrate can include a release surface, e.g., a silicone coating, to enhance separation from the cathode layer.

The cathode mixture can be applied by conventional coating techniques. In some embodiments, the mixture is applied by roll coating, blade or knife coating, or slot extrusion coating. A layer of the cathode mixture can be formed up to about 500-750 microns, depending on the cathode being fabricated.

After the cathode mixture is applied to the substrate, the layer is dried to remove some solvent (step 32). In some circumstances, it is desirable to have residual solvent in the cathode layer after this drying step (step 32). The maximum amount of residual solvent is preferably no greater than 1200 ppm. It is believed that the residual solvent provides the partially dried layer with enhanced physical properties, e.g., flexibility, which enhances the ability of the layer to be laminated and calendered during fabrication (described below).

The particular drying process depends on the cathode being fabricated. Generally, the cathode layer is dried until it can be easily separated from the substrate, e.g., until the cathode layer is dry to the touch. In some embodiments, the cathode layer is dried at a relatively slow rate. Drying the cathode too quickly can degrade materials in the cathode mixture. Drying the cathode layer too quickly can also cause stress defects in the cathode because the solvent can be removed from the cathode layer more quickly than the layer can relax or adjust to the resulting volume changes, which can cause defects such as cracks. It is believed that avoiding defects, such as "mud cracking", generally enhances performance of the cathode. Drying the cathode layer too quickly can also cause the binder to migrate and form a layer of the binder on the surface of the cathode. In some embodiments, the cathode layer is dried relatively slowly at a constant rate, followed by a relatively quick drying rate. The layer can be dried, for example, in air overnight, followed by drying under heat in a forced vacuum.

The cathode layer can be dried using a variety of techniques. For example, the layer can be dried in an oven, under ambient conditions or non-ambient temperatures or pressures, under forced or static air, using microwave radiation, and/or under radio frequency radiation.

After drying, the cathode layer is separated from the substrate (step 34), e.g., by peeling the substrate away from the layer. The substrate can be re-used (step 35). The dried, separated cathode layer, sometimes called a "green film", can be a self-supporting mass, depending on its thickness.

Next, a plurality of green films are layered together (step 36). The number of green films that are layered or stacked is a function of, for example, the thickness of each green film, the thickness of the cathode to be fabricated, the degree to which the green films reduce in thickness after densification (step 38, described below), and whether the cathode to be fabricated is a one-sided or two-sided cathode. A one-sided cathode includes a current collector, e.g., a metal screen, having cathode material only on one side of the current collector. A two-sided cathode includes a current collector having cathode material on both sides of the collector, i.e., the collector is sandwiched between cathode material. Method 10 can be applied to one-sided and two-sided cathodes.

After the desired number of green films is layered together, the films are laminated using pressure and/or elevated temperatures together to form a cathode (step 38). Lamination mechanically bonds the green films together, for example, into one coherent cathode. Lamination also increases the density of the cathode, for example, to its final density. In some embodiments, lamination is performed by calendering the green films, e.g., between rollers, at room temperature or under heat, e.g., at about 250° F. The green films can be calendered all at once or in batches. For example, for a one-sided cathode made of eight green films, all eight films can be calendered at once, or two batches of four films can be calendered, followed by calendering the two batches together. Other methods of laminating, such as stamping or pressing, can also be used.

The laminated cathode from step 38 is then bonded to a current collector (step 44) to form an electrode.

The current collector is a conductive member, e.g., a metal screen such as expanded aluminum foil, coated with a binder or an adhesive to provide good bonding with the cathode. The current collector is coated with the binder by conventional methods (step 40) on one or both sides. In some embodiments, the binder is coated by rolling, spraying, drawdown coating, or gravure coating. The thickness of the binder depends, in part, on the coating method. Generally, the current collector is coated with a bonding agent (sometimes called a primer) to facilitate good bonding with the cathode. Examples of primers include thermoplastic conductive coatings, such as EB-012 (a graphite loaded colloidal dispersion available from Acheson Colloids, Inc). After the current collector is coated with the primer, the collector can be heated to soften the primer and to make it tackier for good adhesion to the cathode (step 42). For example, a current collector having a 7-25 micron thick coating of an adhesive can be dried under forced hot air at about 70-95° C. for about 3-10 minutes.

The cathode can be bonded to the prepared current collector by pressing them together (or by lamination). Bonding is performed until there is good contact between the cathode and the current collector. For two-sided cathodes, the current collector can be bonded to cathodes on both sides in one bonding step. Alternatively, the current collector can be bonded to a first cathode in a first bonding step, following by a second bonding step in which a second cathode is bonded to the current collector-first cathode structure. In some embodiments, the cathode(s) is bonded to a bare current collector, i.e., one without a coating of a binder.

The bonded electrode is then dried (step 46). Drying, e.g., under heat and/or vacuum, can remove unwanted water from the electrode. For example, the electrode can be dried at about >100° C. fr overnight. In some embodiments, this drying step is omitted.

The electrode can be cut to a desired size (step 48), and incorporated into a desired battery (step 50). For example, for a prismatic battery requiring a cathode, the electrode can be cut to a desired size and used as-is. For a cylindrical battery, the electrode can be cut to size (e.g., a rectangle), and formed into a cylinder by connecting two parallel edges together. Cathode material near the edges can be removed from the electrode to expose the current collector, which can then be welded together to form a seam.

Methods of assembling a battery, including cathode compositions, have been described elsewhere. For example, a primary alkaline battery is described in commonly-assigned U.S. Ser. No. 09/563,447, entitled "Battery" and filed on May 1, 2000. A Li/MnO$_2$ battery is described is commonly-assigned U.S. Ser. No. 10/022,289, filed Dec. 14, 2001, and entitled "Electrolyte Additive for Non-Aqueous Electrochemical Cells". A metal-air battery is described in U.S. Patent No. 6,232,007. An air-recovery battery is described in U.S. Patent No. 6,270,921. These patents and applications are all hereby incorporated by reference in their entirety.

Method 10 can be used to form electrodes having, for example, up to 32 layers, and/or as thick as 1100 microns after densification or calendering. Each green layer (without using dispersing aids) can be as thick as 220 microns thick. In some embodiments, thickness can range (in the green film) about 175 to about 220 microns. Material loadings, which are not limited by the process, as high as 330 mg/cm$^2$ (at 1250 microns thick) have been achieved.

OTHER EMBODIMENTS

The chemical and/or physical properties of individual green film layers can be controlled, for example, can be modified relative to one another, to affect the performance of the electrode. In some embodiments, to enhance the ionic conductivity/transport of the electrode, the porosity (or density) of the electrode can be stratified as a function of each layer. For example, the electrode can have a layer of relatively low porosity (high density) next to the current collector, and layer(s) of increasing porosity (low density) with increasing distance from the current collector. The porosity of the layers can be controlled by modifying the lamination of the green films. For example, the "inner" layers can be densified under higher calendering pressures than the calendering pressures of the "outer" layers. Relative to the distance from the current collector, the porosity of the layers can increase or decrease, linearly or non-linearly, e.g., alternating high and low porosities. For two-sided electrodes, the cathode on the first side can be modified differently than the cathode on the second side.

In some embodiments, to enhance electronic conductivity of the electrode, the electronic conductivity of the electrode can be stratified. The electronic conductivity of the layers can be controlled, for example, by controlling the amount of conductive aid, e.g., carbon black or graphite, in the layers, or by controlling the degree of densification. For example, the electronic conductivity of relatively porous outer layers can be compensated by or enhanced by adding a conductive additive. Relative to the distance from the current collector, the conductivity of the layers can increase or decrease, linearly or non-linearly, e.g., alternating high and low conductivities. For two-sided electrodes, the cathode on the first side can be modified differently than the cathode on the second side.

In certain embodiments, the composition of the layers can be modified, e.g., to be non-homogeneous. The electrode can include layers with different chemical compositions to provide different properties. For example, the electrode may include layers optimized to perform at relatively high discharge rates and layers optimized to perform at relatively low discharge rates, which could provide the electrode with versatile performance under a broad range of discharge rates. Two different compositions can improve the recovery of the electrode, e.g., after a partial discharge condition. For two-sided electrodes, the cathode on the first side can be modified differently than the cathode on the second side.

The amount of binder in the layers, e.g., the inner layers, can be modified to alter the mechanical bonding, e.g., to the current collector. Different binders can be used in the layers. For example, some binders can be selected to optimize bonding to the current collector, and some binders can be selected to optimize layer-to-layer bonding.

The chemical and physical modifications of the layers described above can be used individually or combined. For example, an electrode can have only stratified porosity, or stratified porosity and stratified electronic conductivity.

Figure 2:
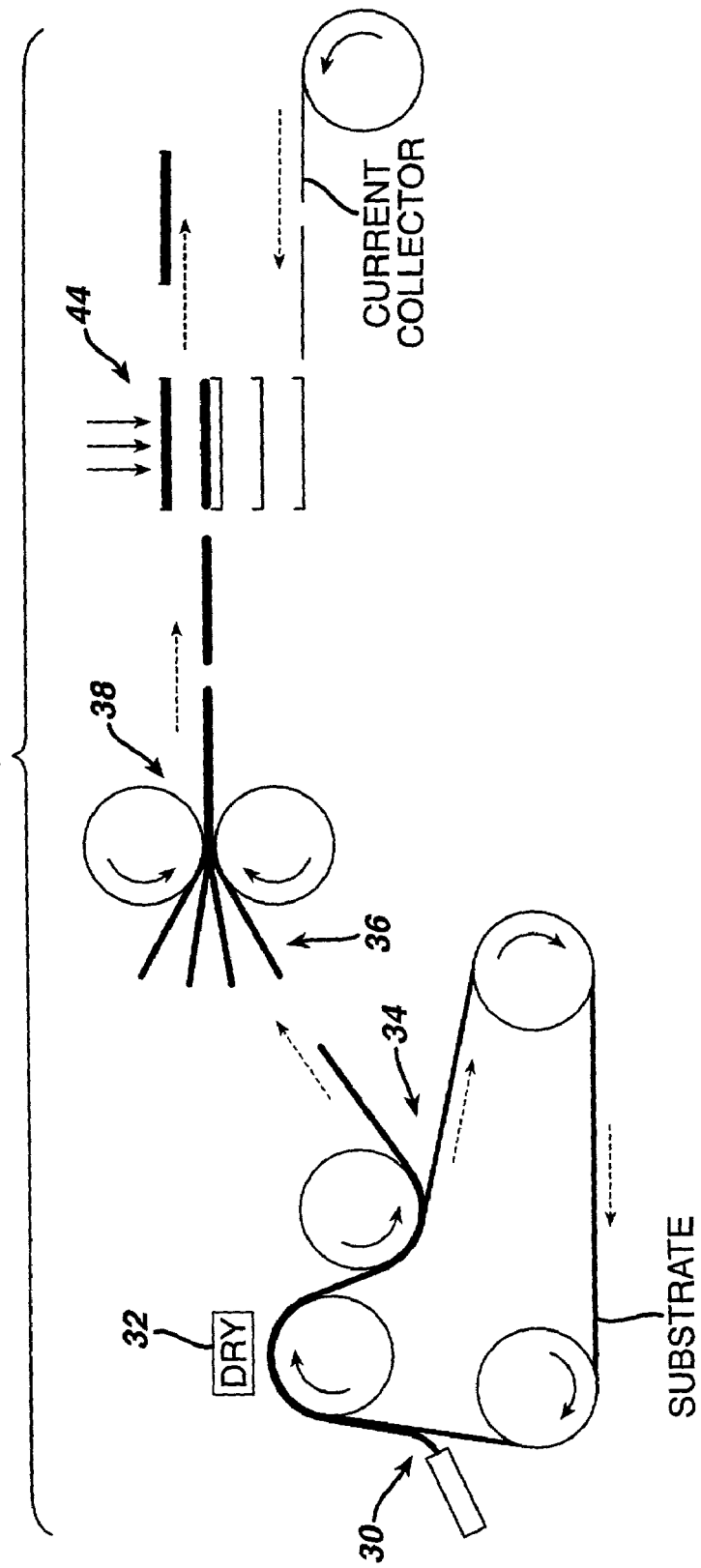
FIG. 2 is an illustration of an embodiment of a continuous method of making a battery electrode.

Referring to FIG. 2, the methods described above can be performed as a semi-continuous or a continuous process, e.g., by applying the cathode mixture on a belt of the substrate.

In other embodiments, the components of the cathode mixture are blended together (e.g., step 28) without pre-blending. The current collector (with or without a binder) can be bonded with the green films when the films are laminated together, e.g., in step 38, vis-à-vis, after the films have been laminated together. The binder can be selected to crosslink or cure during drying.

Method 10 described above can be used to form an electrode having one thick cathode layer. That is, the electrode need not be formed of multiple cathode layers.

The following example is illustrative and not intended to be limiting.

EXAMPLE

The following example shows a method of making a one-sided LiCoO$_2$ cathode, which can have as many as 32 layers.

A cathode slurry was prepared by separately blending electrode material with a conductive aid, and separately blending a binder with a solvent. About 453 g of LiCoO$_2$ (5.2 g/cc) was blended with about 26 g of carbon black (Shawinigan acetylene black, AB50% from Chevron Chemical Co.) (1.95 g/cc) in a tubular mixer for about 60 minutes. About 21 g of a binder (Viton AHV (1.86 g/cc)) was blended with about 467 cc of a solvent (1:1 by volume of NMP and MIBK, 0.913 g/cc) in a IL beaker and stirred for about 12 hrs. The two mixtures were combined and blended until the fineness of grind was less than about 20 microns. The blend was then mixed in a low shear double planetary (e.g., Ross Mix) for about 10-20 minutes at room temperature, to form a homogeneous slurry. The solvent concentration was about 81 vol % or 46 wt %.

The slurry was coated on a 1 mil thick silicone coated PET release liner using a small draw down table coater. The coating was about 400 microns thick when wet. The slurry on the substrate was dried by air drying overnight, and drying under vacuum for about 4 hours at about 150° C. The resulting dry coating was about 200 microns. The solvent concentration after drying was about <100 ppm.

The substrate was peeled away from the dried coating to provide a green film having a porosity of between about 50-60%.

Multiple (2 to about 32 layers) green films were layered together and calendered to yield a cathode. Calendering pressures were about 18,000 pounds per linear inch. Calendering can be performed in one pass or multiple passes, e.g., 2 or 3 passes. The formed cathode had a porosity of about 27-35%.

A current collector was prepared by coating an aluminum foil with a conductive binder (Acheson EB-012) 20 microns thick (wet) using a drawdown coater. The coated current collector was air dried. The dried binder was about 10 microns thick.

The aluminum current collector was bonded to the cathode by pressing under about 250-350 psi at about 100° C. for about 5 sec to yield an electrode. The electrode was dried overnight in an oven at 150° C., and incorporated into an assembly of a soft bodied "bag cell" (5 cm×8 cm).

Figure 3:
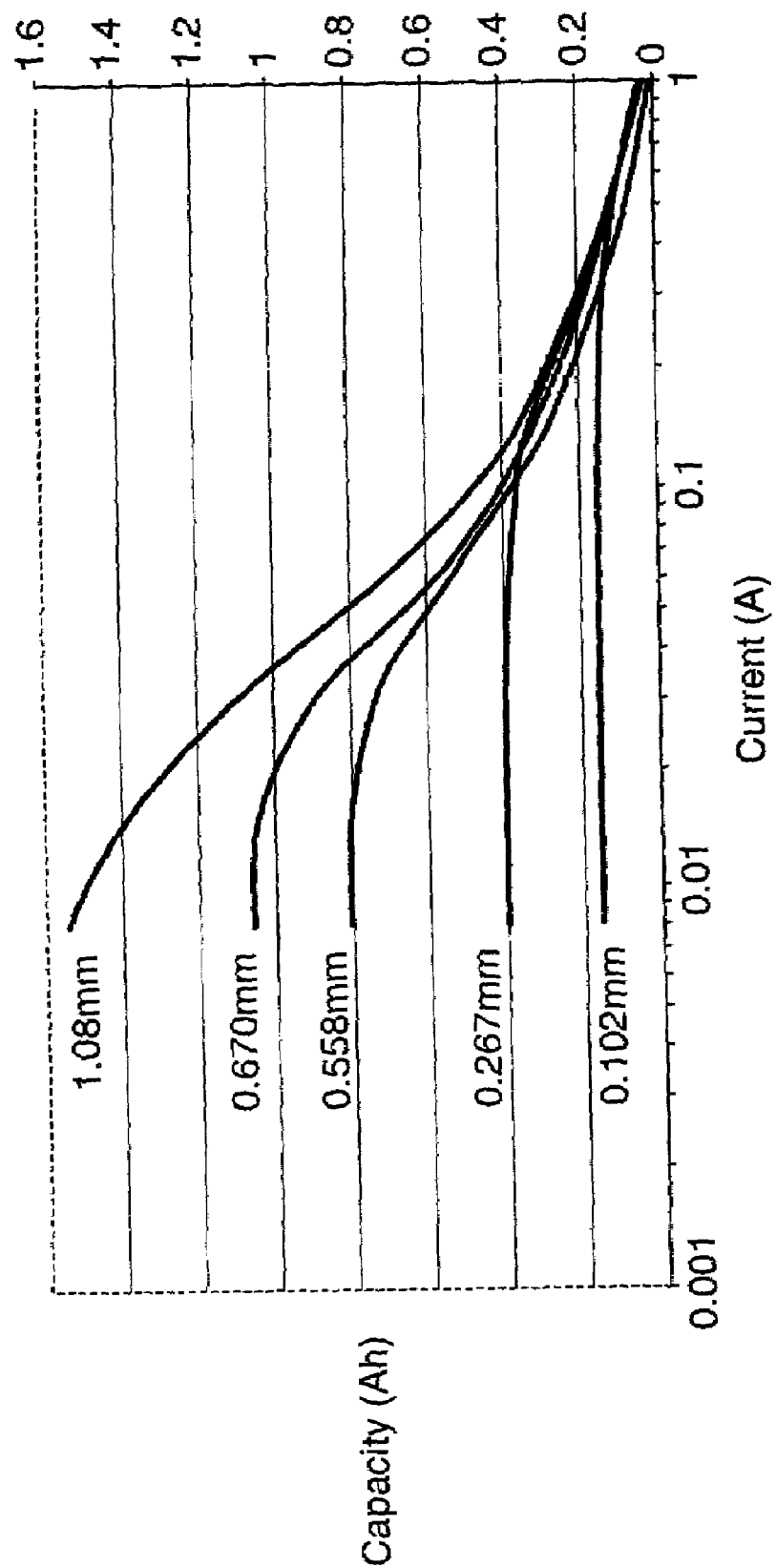
FIG. 3 is a plot of capacity (Ah) vs. current (A) for embodiments of cells having cathodes of different thickness.
Figure 4:
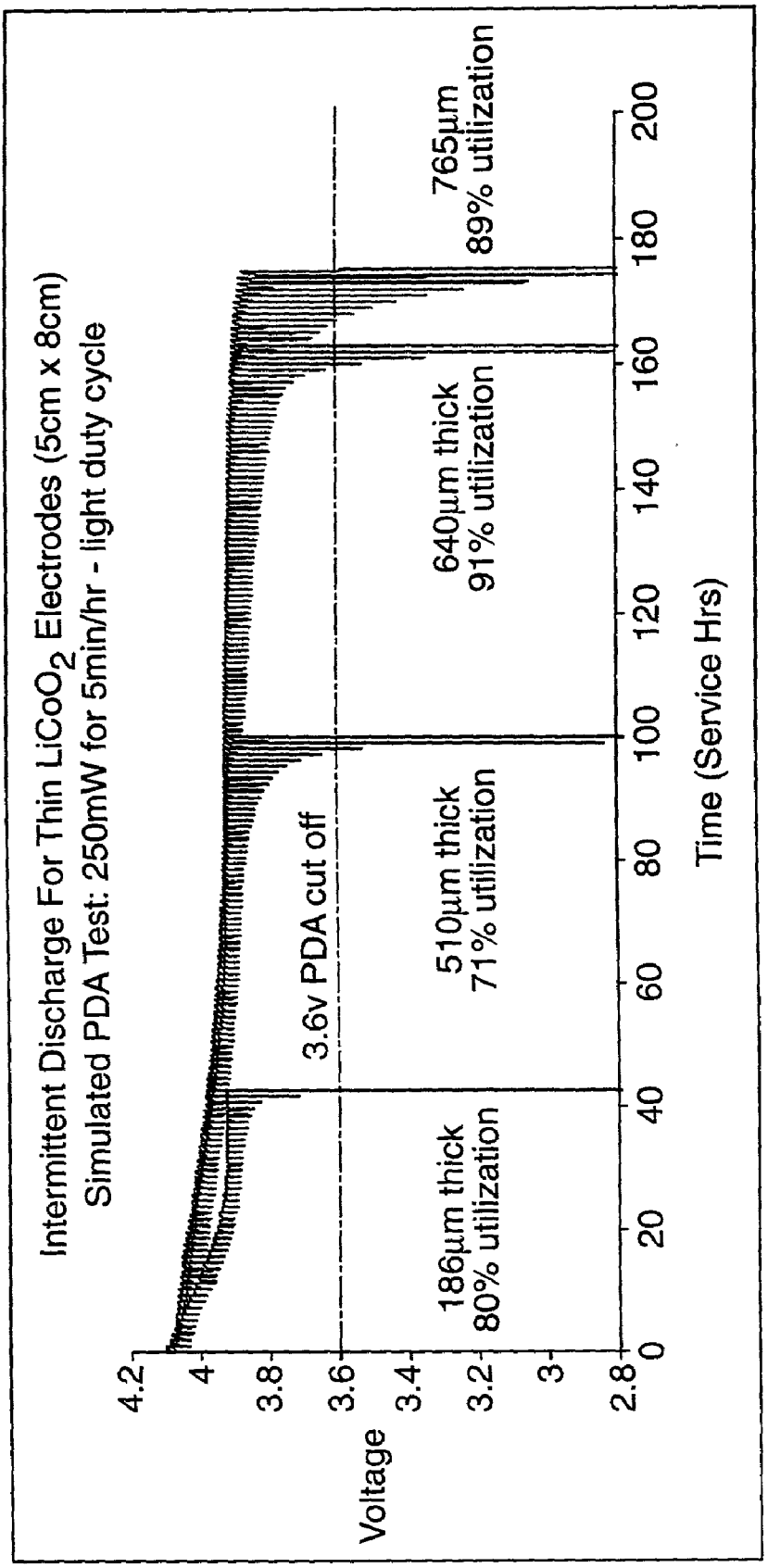
FIG. 4 is a plot of voltage (V) vs. time (hr) for embodiments of cells having cathodes of different thickness under a simulated personal digital assistant (PDA) performance test.

FIG. 3 shows a plot of capacity as a function of current for cells with cathodes of different thickness. FIG. 4 shows a plot of voltage as a function of time for cells with cathodes of different thickness under a simulated personal digital assistant (PDA) performance test.

FIG. 5 shows some test results for cells having cathodes with different concentrations of binder. FIG. 6 shows some test results for cells charged at constant current density. FIG. 7 shows the limiting currents (for 80% capacity utilization) for cells having cathodes with different thickness under continuous drain. The cathodes were prepared in the same manner as described above.

All publications and patents mentioned in this application are herein incorporated by reference to the same extent as if each individual publication or patent was specifically and individually indicated to be incorporated by reference.

Other embodiments are in the claims.

What is claimed is:

1. A method of making a cathode for a battery, comprising
   (a) coating a first cathode mixture comprising a first electrode active material, a first binder, and a first solvent onto a first substrate removing only a portion of the first solvent after coating the first cathode mixture, and then removing the first substrate to provide a first cathode layer including at least the first electrode active material, some of the first solvent, and the first binder, but no substrate, and;
   (b) coating a second cathode mixture comprising a second electrode active material, a second binder, and a second solvent onto a second substrate, removing only a portion of the second solvent after coating the second cathode mixture, and then removing the second substrate to provide a second cathode layer including at least the second electrode active material, some of the second solvent, and the second binder, but no substrate;
   (c) layering the first cathode layer including at least the first electrode active material, some of the first solvent, and the first binder, but no substrate onto the second cathode layer including at least the second electrode active material, some of the second solvent, and the second binder, but no substrate to provide a cathode stack; and
   (d) bonding a current collector to the cathode stack to provide the cathode.

2. The method of claim 1, wherein step (a) further comprises
   (i) blending the first binder and the first solvent;
   (ii) blending the first electrode active material and a conductive aid; and
   (iii) combining the blends from (i) and (ii) to provide the first cathode mixture.

3. The method of claim 1, wherein the first binder comprises a polymer.

4. The method of claim 3, wherein the first binder is selected from the group consisting of polyvinylidene fluoride, hexafluoropropylene, and polytetrafluoroethylene.

5. The method of claim 1, wherein the solvent in the first cathode mixture is selected from the group consisting of acetone, methyl ethyl ketone, diisobutyl ketone, methylpyrrolidone, and methyl isobutyl ketone.

6. The method of claim 1, wherein the first cathode mixture further comprises a conductive aid.

7. The method of claim 6, wherein the conductive aid comprises carbon.

8. The method of claim 1, wherein step (c) comprises laminating the first layer and the second layer after step (c).

9. The method of claim 8, wherein step (d) comprises bonding the cathode stack to the current collector as part of the lamination.

10. The method of claim 1, wherein the current collector has a first surface and a second surface and the cathode stack is bonded to the first surface, the method further comprising
    (e) repeating steps (a)-(c) to produce a second cathode stack; and
    (f) bonding the second cathode stack to the second surface of the current collector.

11. The method of claim 1, wherein step (a) further comprises
    (i) blending the first binder and the first solvent;
    (ii) blending the first electrode active material and a conductive aid; and
    (iii) combining the blends from (i) and (ii) to provide the first cathode mixture.

12. A method of making a cathode for a battery, comprising
    (a) coating a first cathode mixture comprising a first electrode active material, a first binder, and a first solvent onto a first substrate and then removing the first substrate to provide a first cathode layer including at least the first electrode active material and the first binder, but no substrate;
    (b) coating a second cathode mixture comprising a second electrode active material, a second binder, and a second solvent onto a second substrate and then removing the second substrate to provide a second cathode layer including at least the second electrode active material and the second binder, but no substrate;
    (c) layering the first cathode layer onto the second cathode layer to provide a cathode stack including the first cathode layer and the second cathode layer;
    (d) bonding a first surface of a current collector to the cathode stack to provide the cathode;
    (e) repeating steps (a)-(c) to produce a second cathode stack; and
    (f) bonding the second cathode stack to the second surface of the current collector.

13. A method of making a cathode for a battery, comprising
    (a) blending a first binder and a first solvent;
    (b) blending a first electrode active material and a conductive aid;
    (c) combining the blends from (a) and (b) to provide a first cathode mixture;
    (d) coating a first cathode mixture onto a first substrate and then removing the first substrate to provide a first cathode layer including at least the first electrode active material, the conductive aid, and the first binder, but no substrate;
    (e) coating a second cathode mixture comprising a second electrode active material, a second binder, and a second solvent onto a second substrate and then removing the second substrate to provide a second cathode layer including at least the second electrode active material and the second binder, but no substrate;
    (f) layering the first cathode layer onto the second cathode layer to provide a cathode stack including the first cathode layer and the second cathode layer; and
    (g) bonding a current collector to the cathode stack to provide the cathode.

* * * * *